United States Patent
Mar et al.

(10) Patent No.: US 11,970,128 B2
(45) Date of Patent: Apr. 30, 2024

(54) VEHICLE AIRBAG SYSTEMS

(71) Applicants: William Mar, Davisburg, MI (US); Alan R Kirby, West Bloomfield, MI (US); Grant T Smith, Rochester Hills, MI (US); Michael J Jarvis, Washington Township, MI (US); Mark A Steinbach, Clawson, MI (US); Jerry Domulewicz, Auburn Hills, MI (US)

(72) Inventors: William Mar, Davisburg, MI (US); Alan R Kirby, West Bloomfield, MI (US); Grant T Smith, Rochester Hills, MI (US); Michael J Jarvis, Washington Township, MI (US); Mark A Steinbach, Clawson, MI (US); Jerry Domulewicz, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/671,749

(22) Filed: Feb. 15, 2022

(65) Prior Publication Data
US 2022/0258690 A1    Aug. 18, 2022

Related U.S. Application Data

(60) Provisional application No. 63/149,706, filed on Feb. 16, 2021.

(51) Int. Cl.
*B60R 21/213* (2011.01)
*B60R 13/02* (2006.01)
*B60R 21/214* (2011.01)
*B60R 21/215* (2011.01)
*B60R 21/216* (2011.01)
*B60R 21/232* (2011.01)

(52) U.S. Cl.
CPC ........ *B60R 21/213* (2013.01); *B60R 13/0206* (2013.01); *B60R 13/025* (2013.01); *B60R 21/214* (2013.01); *B60R 21/216* (2013.01); *B60R 21/232* (2013.01); *B60R 2013/0293* (2013.01); *B60R 2021/21506* (2013.01); *B60R 2021/2161* (2013.01)

(58) Field of Classification Search
CPC .. B60R 2021/0072; B60R 2021/21506; B60R 2021/2161; B60R 2021/2176; B60R 21/213; B60R 21/214; B60R 21/215; B60R 21/216; B60R 21/232; B60R 13/0206; B60R 13/025; B60R 13/0275; B60R 2013/0281; B60R 2013/0287; B60R 2013/0293
See application file for complete search history.

(56) References Cited

U.S. PATENT DOCUMENTS 5,921,576 A  *  7/1999  Sinnhuber ............. B60R 21/217
                                                    280/730.2
5,938,233 A  *  8/1999  Specht .................... B60J 10/30
                                                    280/730.2

(Continued)

*Primary Examiner* — Laura Freedman
(74) *Attorney, Agent, or Firm* — Jeremy J. Klobucar (57) ABSTRACT

A sealed modular trim supplemental side air bag inflatable curtain (SABIC) module assembly includes a SABIC and a vehicle trim assembly encapsulating the SABIC. The (Continued)

SABIC is sealed within the vehicle trim assembly and provided as a complete compact module configured for subsequent attachment to a vehicle roll bar.

20 Claims, 8 Drawing Sheets

(56) References Cited

U.S. PATENT DOCUMENTS

| | | | |
|---|---|---|---|
| 6,059,311 A * | 5/2000 | Wipasuramonton ........................ B60R 21/213 280/730.2 |
| 6,102,435 A * | 8/2000 | Wallner ............. B60R 13/0212 280/730.2 |
| 6,126,192 A * | 10/2000 | Enders ................ B60R 21/2176 280/730.2 |
| 6,179,324 B1 * | 1/2001 | White, Jr. ........... B60R 13/0212 280/730.2 |
| 6,227,561 B1 * | 5/2001 | Jost .................... B60R 13/0212 280/730.2 |
| 6,435,544 B1 * | 8/2002 | Brucker ............... B60R 21/213 280/730.2 |
| 6,439,598 B1 | 8/2002 | Braun et al. |
| 7,219,925 B2 * | 5/2007 | Hill ....................... B60R 21/055 280/730.2 |
| 7,694,998 B2 * | 4/2010 | Hidaka ................ B60R 21/213 280/730.2 |
| 7,744,120 B2 * | 6/2010 | Rust ..................... B60R 21/213 280/730.2 |
| 10,538,216 B2 | 1/2020 | White et al. |
| 10,562,460 B2 * | 2/2020 | Forgette ..................... B60J 7/11 |
| 10,807,556 B2 | 10/2020 | Hill et al. |
| 11,390,236 B2 * | 7/2022 | Tallapragada ...... B60R 21/2165 |
| 11,396,269 B2 * | 7/2022 | Terbu .................... B60R 21/231 |
| 2001/0022441 A1 | 9/2001 | Nakajima et al. |
| 2002/0125705 A1 | 9/2002 | Wong et al. |
| 2002/0190508 A1 * | 12/2002 | Jost .................... B60R 21/2346 280/730.2 |
| 2005/0052001 A1 | 3/2005 | Totani et al. |
| 2006/0138763 A1 * | 6/2006 | Brady .................. B60R 21/231 280/756 |
| 2006/0261580 A1 | 11/2006 | Tiesler et al. |
| 2016/0167614 A1 | 6/2016 | Inami |
| 2022/0258686 A1 * | 8/2022 | Eddings ................. B60J 10/90 |
| 2022/0258691 A1 * | 8/2022 | Tilli ..................... B60R 21/213 |

* cited by examiner

VEHICLE AIRBAG SYSTEMS

CROSS REFERENCE TO RELATED APPLICATION

This application claims the benefit of U.S. Provisional Application No. 63/149,706, filed Feb. 16, 2021, the contents of which are incorporated herein by reference thereto.

FIELD

The present application relates generally to vehicle air bag systems and, more particularly, to supplemental side air bag inflatable curtain (SABIC) assemblies for vehicles.

BACKGROUND

Conventional inflatable air bags are configured to deploy in vehicles to protect the occupants in the event of an impact event that would tend to urge the occupant toward the vehicle body such as the dashboard or windshield. In a vehicle operating situation calling for deployment of the air bag, inflation gas is communicated from the inflator to rapidly inflate and deploy the air bag cushion. One type of inflatable air bag is a side curtain typically deployed from positions along a roof of the vehicle above the doors, downward between the occupant and side portions of the vehicle. However, open air vehicles such as those with removable/retractable roofs typically do not include side curtain air bags due to potential sealing issues when exposed to weather, as well as difficulty directing air bag deployment to desired areas when the roof is removed. Thus, while such conventional air bag assemblies do work well for their intended purpose, it remains desirable to provide improvements in the relevant art.

SUMMARY

In accordance with one example aspect of the invention, a sealed modular trim supplemental side air bag inflatable curtain (SABIC) module assembly is provided. In the example embodiment, the assembly includes a SABIC and a vehicle trim assembly encapsulating the SABIC. The SABIC is sealed within the vehicle trim assembly and provided as a complete compact module configured for subsequent attachment to a vehicle roll bar.

In addition to the foregoing, the described assembly may include one or more of the following features: wherein the vehicle trim assembly provides a watertight enclosure to protect the SABIC from the environment when a roof of the vehicle is removed and the SABIC module assembly is in an open air vehicle interior; wherein the vehicle trim assembly includes a lower trim coupled to an upper trim; wherein the vehicle trim assembly further includes a middle trim coupled between the upper trim and the lower trim; and wherein the upper trim, middle trim, and lower trim are coupled to each other via welding.

In addition to the foregoing, the described assembly may include one or more of the following features: wherein the lower trim includes one or more first apertures configured to align with one or more second apertures formed in the vehicle roll bar, the aligned first and second apertures configured to receive a first fastener for coupling the lower trim to the vehicle roll bar; wherein the upper trim includes one or more third apertures configured to align with one or more fourth apertures formed in the vehicle roll bar, the aligned third and fourth apertures configured to receive a second fastener for coupling the upper trim to the vehicle roll bar; and wherein the upper trim includes one or more first apertures configured to align with one or more second apertures formed in the vehicle roll bar, the aligned first and second apertures configured to receive a fastener for coupling the upper trim to the vehicle roll bar.

In addition to the foregoing, the described assembly may include one or more of the following features: an attachment bracket configured to couple the SABIC to the vehicle trim assembly; wherein the attachment bracket includes a lower portion configured to attach to the SABIC, and an upper portion configured to couple to the upper trim; wherein the lower portion includes a slot to receive a tether strap of the SABIC; wherein the upper portion includes a third aperture configured to align with the first and second apertures to receive the faster; wherein the vehicle trim assembly further includes a middle trim coupled between the upper trim and the lower trim, the middle trim having a fourth aperture configured to align with the first, second, and third apertures to receive the fastener; wherein the fourth aperture receives a compression ring configured to mate to the vehicle roll bar; and a vehicle comprising the SABIC module assembly of claim 1 coupled to the vehicle roll bar.

In accordance with another example aspect of the invention, a method of manufacturing a sealed modular trim supplemental side air bag inflatable curtain (SABIC) module assembly is provided. The method includes providing a SABIC, providing a vehicle trim assembly, encapsulating the SABIC in the vehicle trim assembly, wherein the SABIC is sealed within the vehicle trim assembly, and providing the encapsulated SABIC as a complete compact module for subsequent attachment to a vehicle roll bar.

In addition to the foregoing, the described method may include one or more of the following features: wherein the step of encapsulating the SABIC further includes encapsulating the SABIC in a watertight enclosure to protect the SABIC from the environment when a roof of the vehicle is removed and the SABIC module assembly is in an open air vehicle interior; and wherein the step of providing the trim assembly includes providing an upper trim, a middle trim, and a lower trim, and wherein the step of encapsulating the SABIC includes sealing the lower trim to the upper trim, and sealing the middle trim between the upper trim and the lower trim.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

According to the principles of the present application, systems and methods are described for side air bag impact curtain (SABIC) assemblies, including, modular sealed trim SABIC systems or modules, a SABIC sealed module via a two-piece trim two-shot seal, a two-piece trim sealed SABIC module, and a double seal SABIC trim module. In this way, the SABIC is sealed within actual vehicle trim and provided as a complete module that can subsequently be attached to the vehicle roll bar. Some module assemblies include a roll bar attachment bracket that attaches to the SABIC bag with a strap that is folded through holes in the bracket.

Unlike conventional SABICs, which require welded brackets, some systems include a hook assembly to position the system so the operator's hands are free to drive the fasteners to attach the module to the roll bar. Advantageously, the module is configured to attach to the bottom of the roll bar, which allows the fastener to be driven into the bar so no additional clearance is required, thereby providing a compact design that takes up less space than conventional systems. Other advantages include a side curtain air bag deployed through a laser scored trim component, an assembly creating a water tight bond of plastic components for open air interiors, and a side curtain air bag assembly shipped and installed as a complete module.

Figure 1:
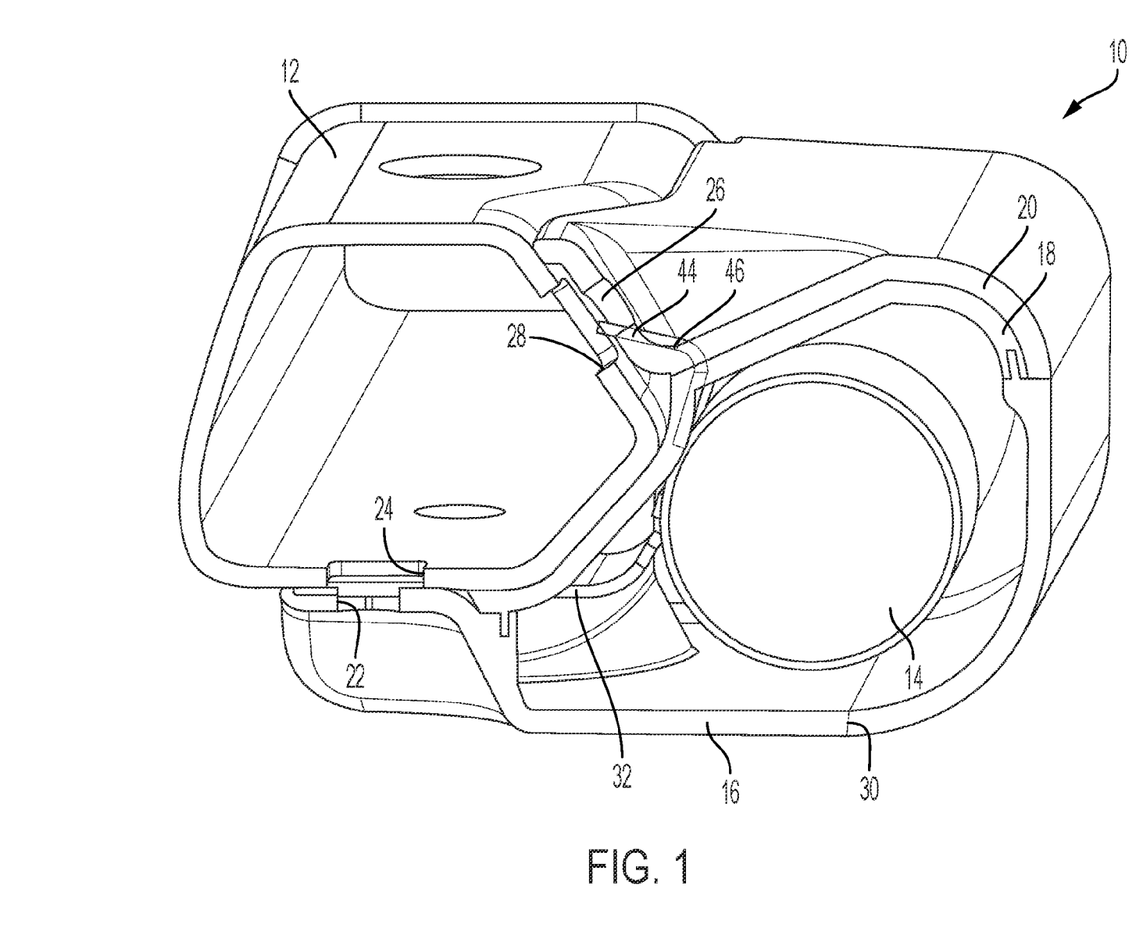
FIG. 1 is a sectional view of an example SABIC assembly in accordance with the principles of the present application.

With initial reference to FIG. 1, an example sealed modular trim SABIC assembly is illustrated and generally identified at reference numeral 10. The modular trim SABIC module assembly 10 is configured to couple to a vehicle roll bar 12 and generally includes a SABIC 14 housed within a module formed by a lower trim 16, a middle trim 18, and an upper trim 20. In the example embodiment, the lower trim 16, middle trim 18, and upper trim 20 are coupled together, for example via welding, to thereby encapsulate the SABIC 14. The resulting module assembly 10 thus eliminates the need for secondary operations to seal the SABIC upon vehicle installation and protects from water, debris, and the environment.

In the example embodiment, the lower trim 16 includes an aperture 22 configured to align with an aperture 24 in the roll bar 12 for receiving a fastener (not shown) to couple the lower trim 16 to the roll bar 12. Similarly, the upper trim 20 includes an aperture 26 configured to align with an aperture 28 in the roll bar 12 for receiving a fastener (not shown) to couple the upper trim 20 to the roll bar 12. In the illustrated example, the lower trim 16 includes a laser score 30 to direct the air bag deployment therethrough.

Figure 2:
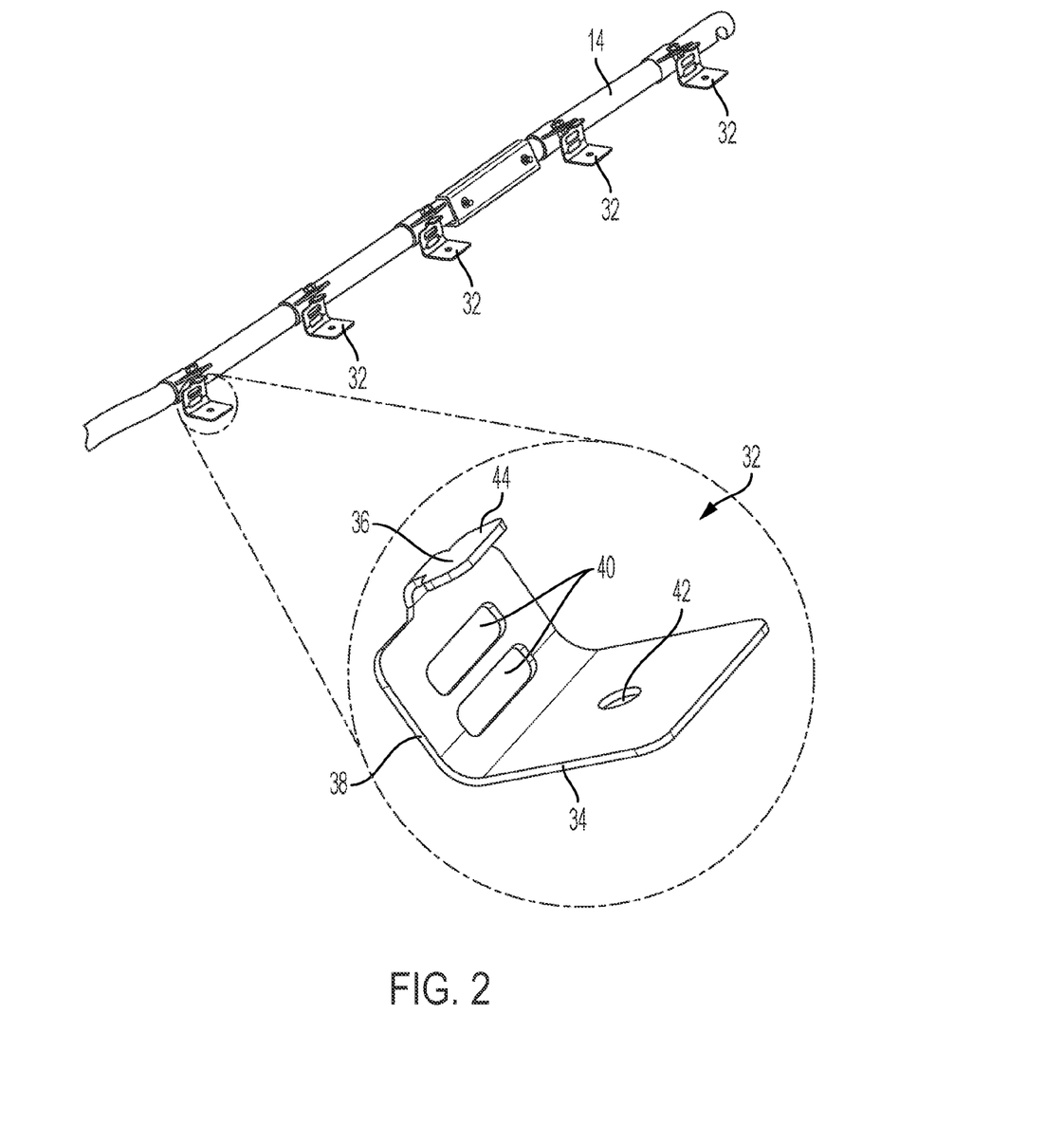
FIG. 2 is a perspective view of the SABIC with example attachment brackets (one shown enlarged), in accordance with the principles of the present application.

With additional reference to FIG. 2, the module assembly 10 also includes an attachment bracket 32 coupled (e.g., stake welded) to the lower trim 16 and configured to couple to the SABIC 14. In the example embodiment, the attachment bracket 32 generally includes a lower attachment plate or member 34, an upper attachment plate or member 36, and an intermediate attachment plate or member 38 extending therebetween. The intermediate attachment member 38 includes a pair of adjacent slots 40 (FIG. 2) configured to receive a tether strap (not shown) from the SABIC 14 to thereby secure the SABIC 14 to the attachment bracket 32. The lower attachment member 34 includes an aperture 42 configured to receive the fastener extending through apertures 22, 24. The upper attachment member 36 includes a hook or tab feature 44 configured to be received within an aperture 46 formed in the roll bar 12. This enables an operator to insert the tab feature 44 into the aperture 46 to subsequently hold and support the SABIC module assembly 10 in the desired orientation. As such, the operator's hands are free to insert the fasteners into apertures 22 and 28 to secure the SABIC module assembly 10 to the roll bar 12. Accordingly, the SABIC module assembly 10 reduces assembly complexity (e.g., shipped as a single module) and comes pre-sealed for protection from water/debris/environment (i.e., without additional sealing measures during installation).

Figure 3:
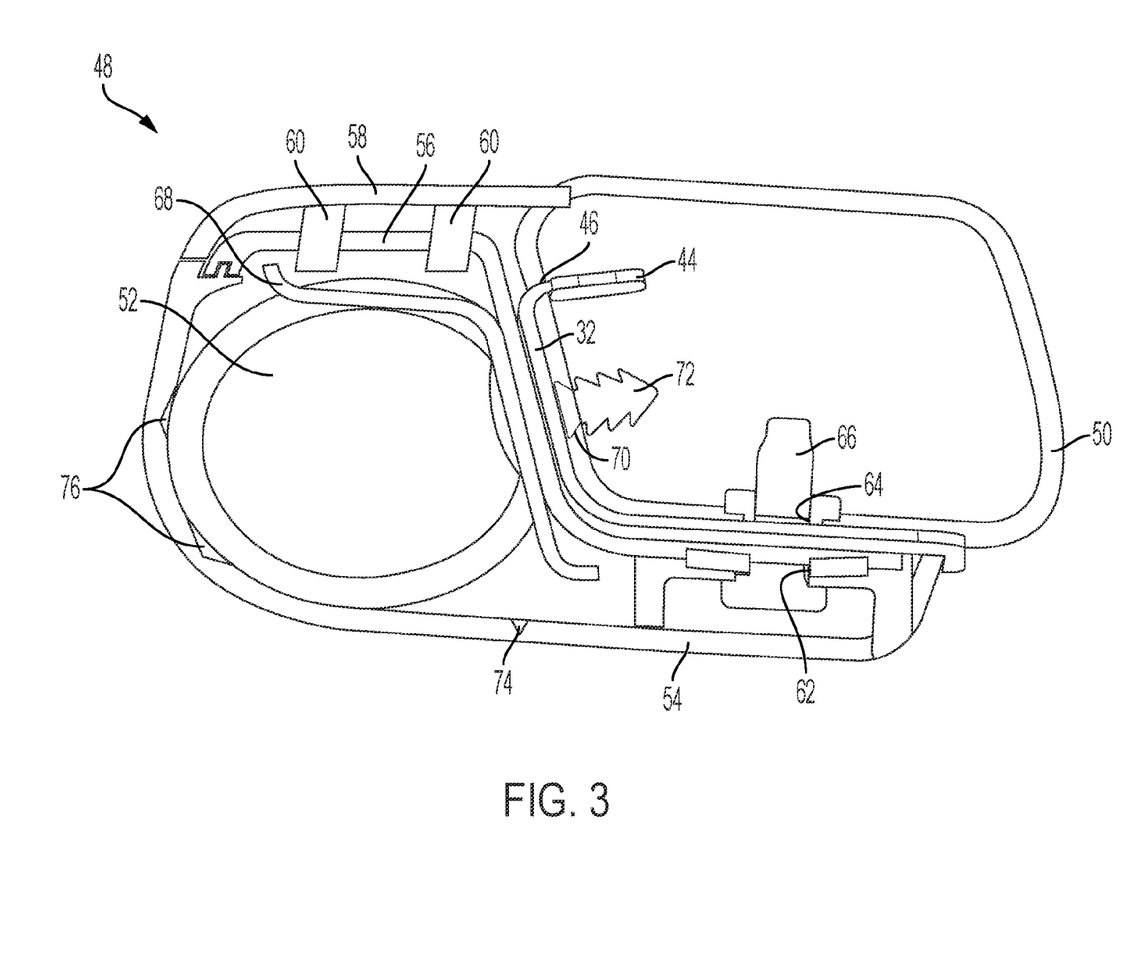
FIG. 3 is a sectional view of another example SABIC assembly in accordance with the principles of the present application.

With reference now to FIG. 3, another example sealed modular trim SABIC assembly is illustrated and generally identified at reference numeral 48. The modular trim SABIC module assembly 48 is configured to couple to vehicle roll bar 50 and generally includes a SABIC 52 housed within a module formed by a lower trim 54, an inner reinforcement trim 56, and an upper trim 58. In the example embodiment, the lower trim 54, inner reinforcement trim 56, and upper trim 58 are coupled together, for example via welding, to thereby encapsulate the SABIC 52. The resulting module assembly 48 thus eliminates the need for secondary operations to seal the SABIC upon vehicle installation. As shown, the upper trim 58 is coupled to the inner reinforcement trim 56 via fasteners 60 (e.g., clips), and an attachment bracket 32 is stake welded to the lower trim 54. A tether strap of the SABIC 52 is received through bracket slots 40 to couple the SABIC 52 to the attachment bracket 32.

In the example embodiment, the lower trim 54 includes an aperture 62 configured to align with an aperture 64 in the roll bar 50 for receiving a fastener 66 to couple the lower trim 54 and thus SABIC module assembly 48 to the roll bar 50. A deflector plate 68 is coupled to the SABIC 52 and/or the upper trim 58 and is configured to direct the deployment of the air bag. One or more apertures 70 in the roll bar 50 are each configured to receive a fastener 72 to further couple the SABIC 52 and/or upper trim 58 to the roll bar 50. Additionally, the lower trim 54 includes a laser score 74 to direct the air bag deployment therethrough. One or more hinges 76 may be formed on the lower trim 54 and/or SABIC 52 to prevent portions of the SABIC assembly 48 from detaching during air bag deployment.

Figure 4:
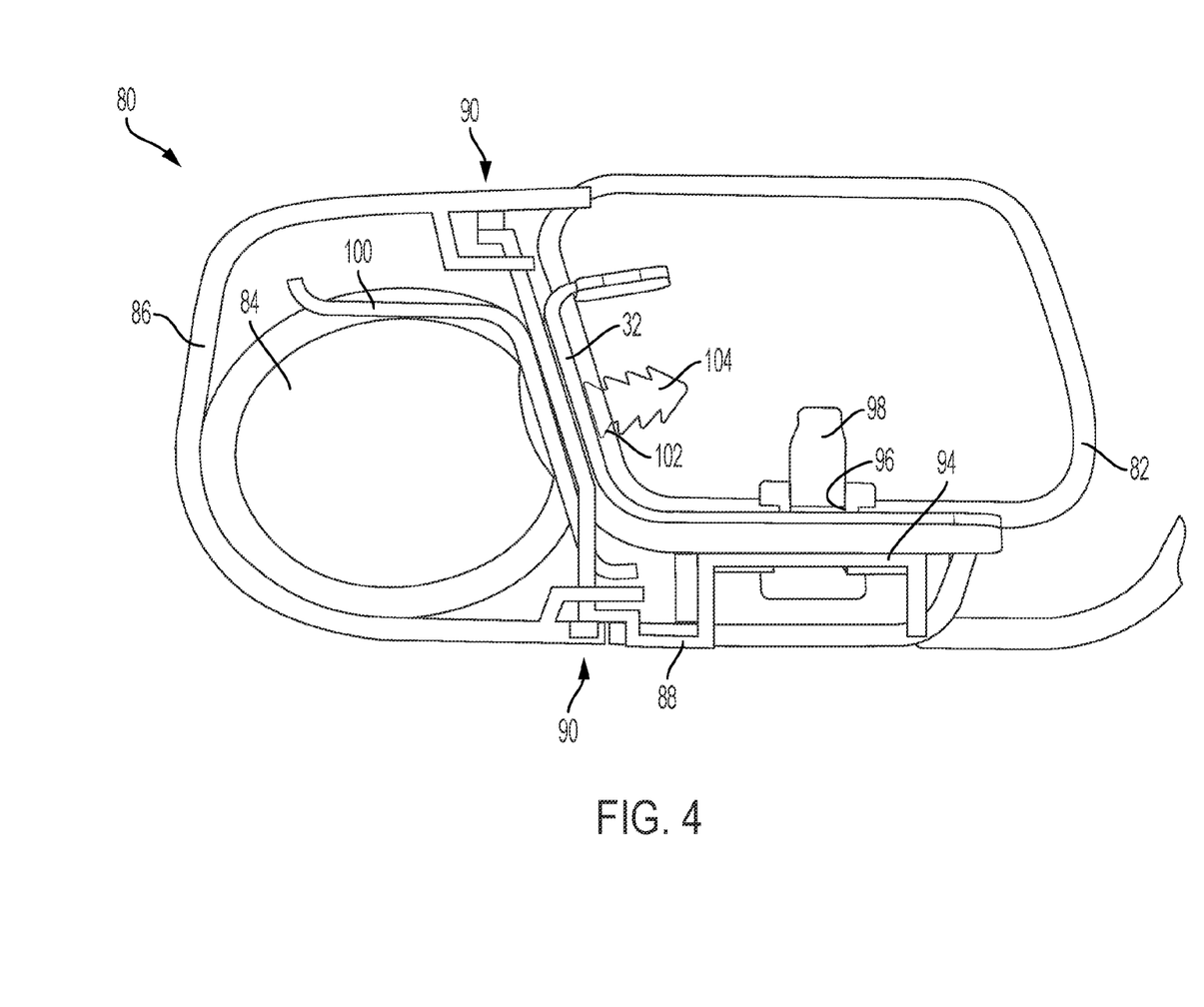
FIG. 4 is a sectional view of yet another example SABIC assembly in accordance with the principles of the present application.

With additional reference to FIG. 4, an example two-piece trim sealed SABIC module assembly is illustrated and generally identified at reference numeral 80. The SABIC module assembly 80 is configured to couple to vehicle roll bar 82 and generally includes a SABIC 84 housed within a module formed by an outer trim 86 and an inner trim 88, which are coupled together, for example via welding or two-shot material (e.g., TPE), to thereby encapsulate the SABIC 84. The resulting module assembly 80 thus eliminates the need for secondary operations to seal the SABIC upon vehicle installation. As shown, the outer trim 86 is coupled to the inner trim 88 via fasteners 90 (e.g., hooks or clips), and an attachment bracket 32 is stake welded to the inner trim 88. A tether strap (not shown) of the SABIC 84 is received through bracket slots 40 to couple the SABIC 84 to the attachment bracket 32.

In the example embodiment, the inner trim 88 includes an aperture 94 configured to align with both bracket aperture 42 and an aperture 96 in the roll bar 82 for receiving a fastener 98 to couple the inner trim 88 to the roll bar 82. The module can include a plurality of such connections to the roll bar 82. A deflector plate 100 is coupled to the SABIC 84 and/or the inner trim 88 and is configured to direct the deployment of the air bag. One or more apertures 102 in the roll bar 82 are each configured to receive a fastener 104 to further couple the SABIC 84 and/or inner trim 88 to the roll bar 82. During air bag deployment, upper fastener 90 acts as a hinge and tether, while the lower fastener 90 separates to allow the SABIC 84 to deploy.

Advantageously, the SABIC assembly 80 includes outer trim 86 hinged at the top, thus allowing the air bag to safely deploy at the bottom interface. The inner trim 88 deflects out of the way via flexible material and hard fastens to the body. The two-piece trim design allows outer trim to attach directly to the inner trim, and hard attachment between the trim and body allows the trim to rotate and detach via lower retention secondary clips. The inner trim has a two-shot TPE seal (molded in seal), and a top of the inner trim permanently fastens to the roll bar and the inner trim rotates about a top mount (e.g., similar to a living hinge).

Figure 5:
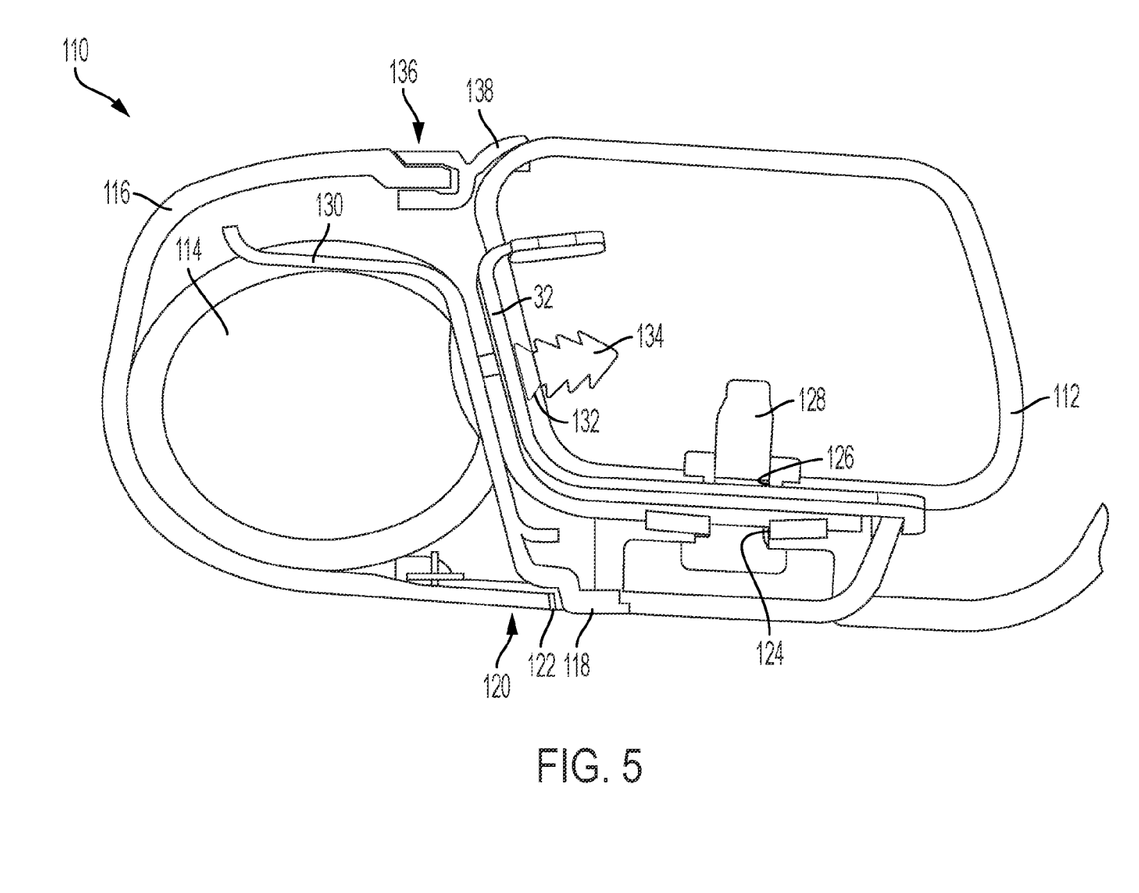
FIG. 5 is a sectional view of yet another example SABIC assembly in accordance with the principles of the present application.

With additional reference to FIG. 5, an example two-piece trim sealed SABIC module assembly is illustrated and generally identified at reference numeral 110. The SABIC module assembly 110 is configured to couple to vehicle roll bar 112 and generally includes a SABIC 114 housed within a module formed by an upper trim 116 and a lower trim 118, which are coupled together, for example via clips, to thereby at least partially encapsulate the SABIC 114. The resulting module assembly 110 thus eliminates the need for secondary operations to seal the SABIC upon vehicle installation. As shown, the upper trim 116 is coupled to the lower trim 118 via fasteners 120 (e.g., clips), which provides a drainage path 122. An attachment bracket 32 is stake welded to the lower trim 118, and a tether strap (not shown) of the SABIC 114 is received through bracket slots 40 to couple the SABIC 114 to the attachment bracket 32.

In the example embodiment, the lower trim 118 includes an aperture 124 configured to align with both the bracket aperture 42 and an aperture 126 in the roll bar 112 to receive a fastener 128 to couple the lower trim 118 to the roll bar 112. A deflector plate 130 is coupled to the SABIC 114 and/or the lower trim 118 and is configured to direct the deployment of the air bag. One or more apertures 132 in the roll bar 112 are each configured to receive a fastener 134 to couple the SABIC 114 and/or lower trim 118 to the roll bar 112. The upper trim 116 includes a sealed joint 136 with a weather seal 138, which is configured to seal against the roll bar 112. During air bag deployment, the sealed joint 136 acts as a hinge and tether for the upper trim 116, while the fastener 120 separates to allow the SABIC 114 to deploy.

Advantageously, the SABIC module assembly 110 provides a two-piece trim component that allows air bag deployment through the upper trim 116 acting as a hinge, protecting from water, debris, and the environment, and providing a drain path for any water within the trim. In this configuration, the air bag deployment path is between the two hard trim components. In this way, the pillar deflects out of the way via flexible material and is hard fastened to the body, trim detaches from the body and is secured through a tether, and the system opens at the bottom of the trim by hinging open.

Figure 6:
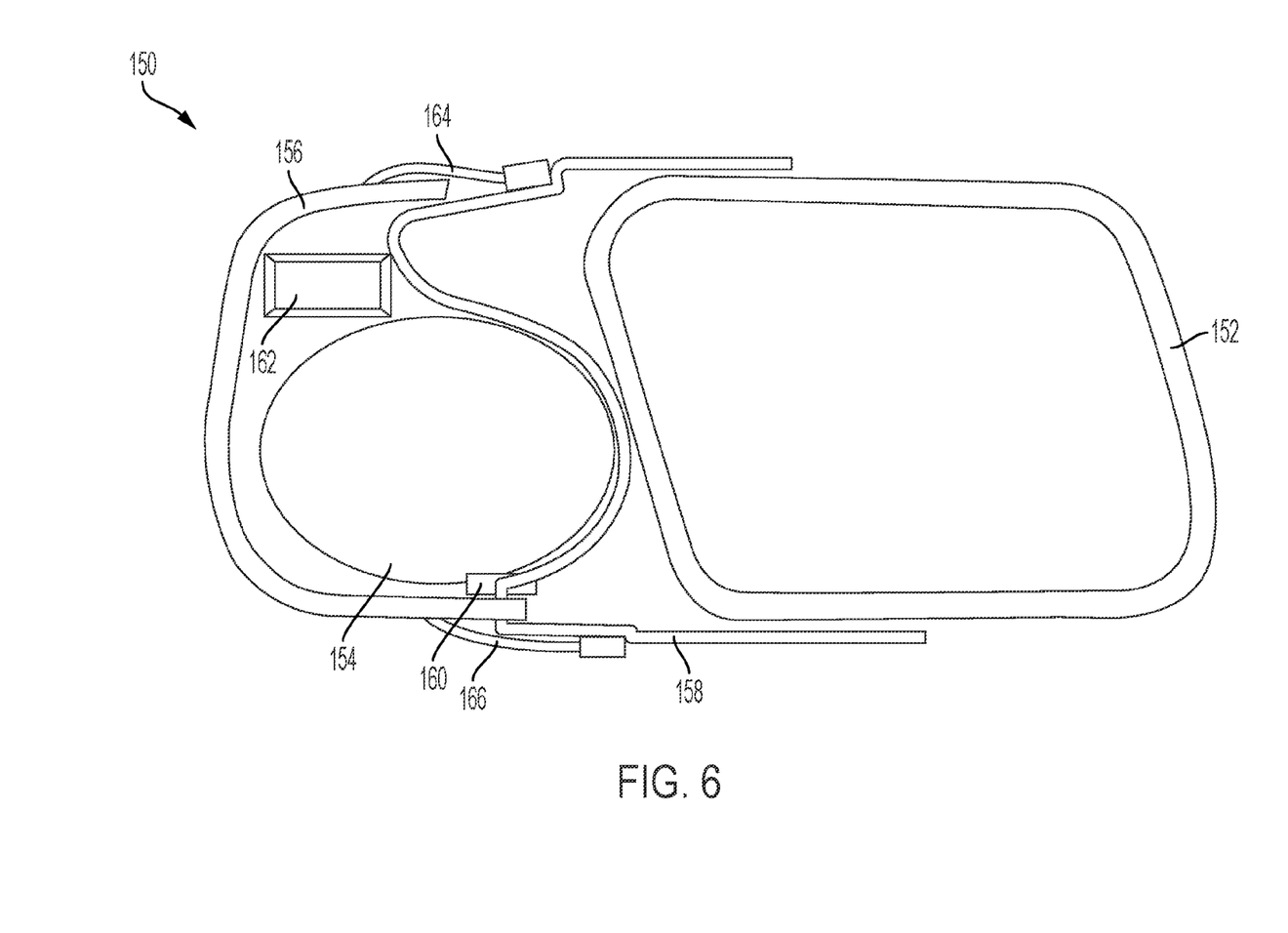
FIG. 6 is a sectional view of yet another example SABIC assembly in accordance with the principles of the present application.

With additional reference to FIG. 6, an example double seal trim SABIC assembly or module is illustrated and generally identified at reference numeral 150. The SABIC module 150 is configured to couple to vehicle roll bar 152 and generally includes a SABIC 154 housed within a module formed by an upper trim 156 and a lower trim 158, which are coupled together, for example via fasteners 160 (e.g., clips), to thereby at least partially encapsulate the SABIC 154. The resulting module assembly 150 thus eliminates the need for secondary operations to seal the SABIC upon vehicle installation. Although not shown, SABIC module 150 may include an attachment bracket 32 as described with other embodiments.

In the example embodiment, the lower trim 158 is coupled to the roll bar 152, for example, via retention clips (not shown). In some embodiments, the upper trim 156 can also be coupled to the roll bar 152. The upper trim 156 is secured to the lower trim 158 via a tether 162. An upper weather seal 164 seals between an upper interface between the upper trim 156 and the lower trim 158, and a lower weather seal 166 seals between a lower interface between the upper trim 156 and the lower trim 158. The seals described herein may be any suitable type of seal such as, for example, a rubber or silicone strip, windshield seal, etc. During air bag deployment, the upper weather seal 164 acts as a hinge for the upper trim 156, while the fastener 160 separates to allow the SABIC 154 to deploy.

Advantageously, the SABIC module assembly 150 provides a double seal trim arrangement that allows deployment via the upper trim 156 acting as a hinge. The upper trim 156 is secured to the body through a tether clip, and the lower trim 158 is attached to the body through high retention clips. During deployment, the pillar deflects out of the way via flexible material and is hard fastened to the body. The upper trim is secured through the tether, and weather seals are integrated into the trim to protect from water, debris, and the environment.

Figure 7:
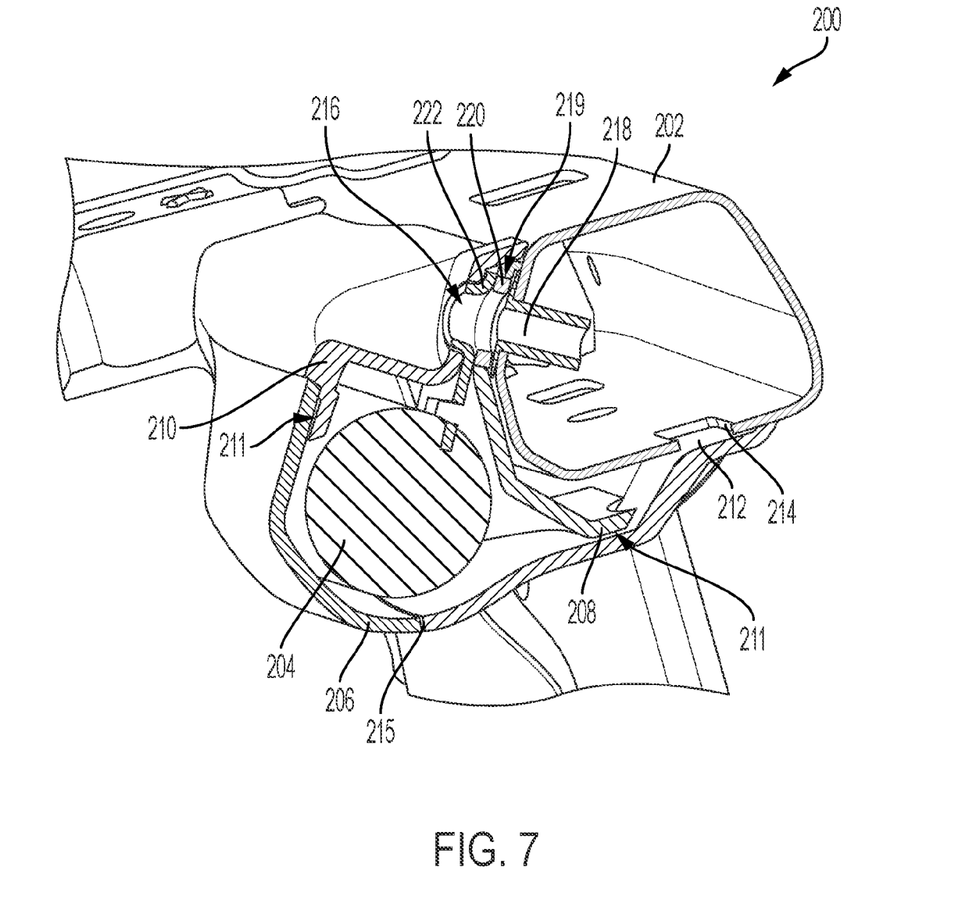
FIG. 7 is a sectional view of yet another example SABIC assembly in accordance with the principles of the present application.
Figure 8:
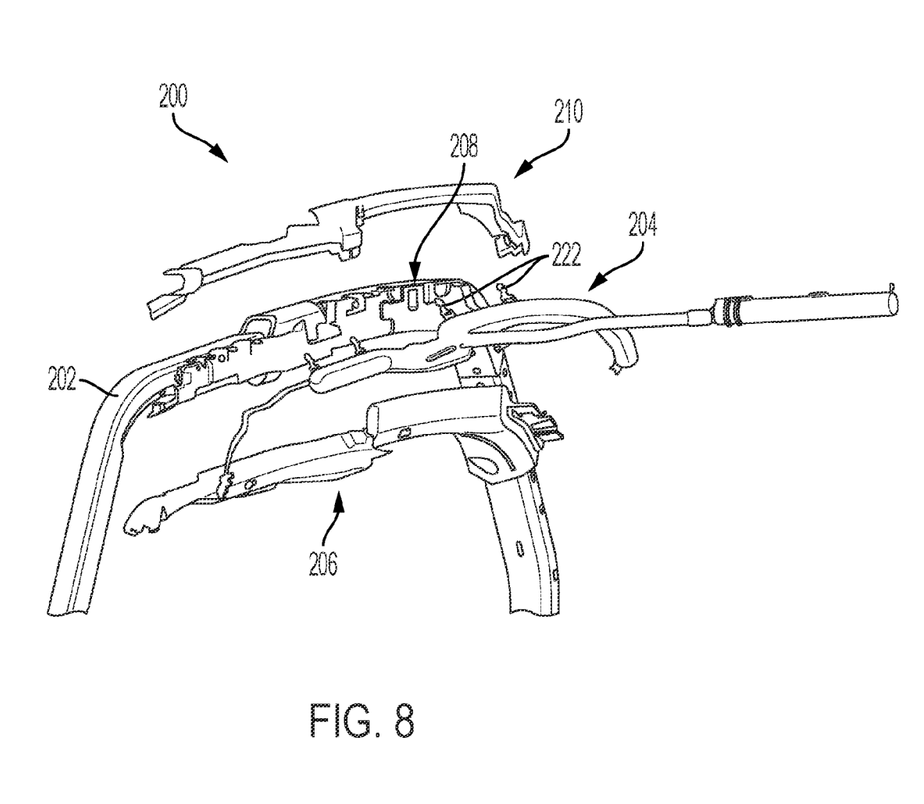
FIG. 8 is a perspective view of the SABIC assembly shown in FIG. 7 before assembly to the roll bar.

With reference now to FIGS. 7 and 8, another example sealed modular trim SABIC module assembly is illustrated and generally identified at reference numeral 200. The modular trim SABIC module assembly 200 is configured to couple to a vehicle roll bar 202 and generally includes a SABIC 204 housed within a module formed by a lower trim 206, a reinforcing middle trim 208, and an upper trim 210. In the example embodiment, the lower trim 206, middle trim 208, and upper trim 210 are coupled together at locations 211, for example via welding, to thereby encapsulate the SABIC 204. The resulting module assembly 200 thus eliminates the need for secondary operations to seal the SABIC upon vehicle installation and protects from water, debris, and the environment.

In the example embodiment, the lower trim 206 includes an aperture 212 configured to align with an aperture 214 in the roll bar 202 for receiving a fastener (not shown) to couple the lower trim 206 to the roll bar 202. In the illustrated example, the lower trim 206 includes a laser score 215 to direct the air bag deployment therethrough. The upper trim 210 includes an aperture 216 configured to align with an aperture 218 in the roll bar 202 for receiving a fastener (not shown) to couple the upper trim 210 to the roll bar 202. Similarly, the middle trim 208 includes an aperture 219 configured to align with the apertures 216, 218 for also receiving the fastener to couple the upper trim 210 to the roll bar 202. Additionally, in the example embodiment, the middle trim aperture 219 is sized to receive and couple with a metal compression ring 220 to ensure metal to metal compression when the fastener is attached to the roll bar 202.

Figure 9:
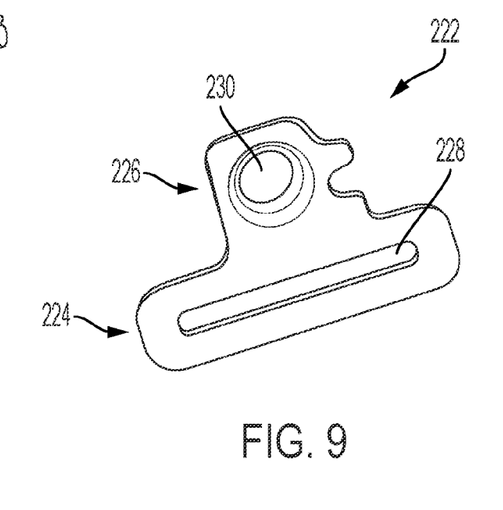
FIG. 9 is a perspective view of an example attachment bracket of the SABIC assembly shown in FIGS. 7 and 8.

With additional reference to FIG. 9, the module assembly 200 also includes an attachment bracket 222 coupled (e.g., stake welded) to the lower trim 206 and configured to couple to the SABIC 204. In the example embodiment, the attachment bracket 222 generally includes a lower attachment portion or member 224 and an upper attachment portion or member 226. The lower attachment member 224 includes a slot 228 configured to receive a strap (not shown) from the SABIC 204 to thereby secure the SABIC 204 to the attachment bracket 222.

In one example, the strap is inserted through the slot 228 and the opposite ends of the strap are then attached (e.g., sewn) to the SABIC 204. The upper attachment member 226 includes an aperture 230 configured to receive the fastener extending through apertures 216, 218. During assembly, fasteners are inserted into apertures 216, 218, 230 and apertures 212, 214 to secure the SABIC module assembly 200 to the roll bar 202. Accordingly, the SABIC module assembly 200 reduces assembly complexity (e.g., shipped as a single module) and comes pre-sealed for protection from water/debris/environment (i.e., without additional sealing measures during installation).

Described herein are systems and methods for SABIC devices. The systems include a SABIC bag sealed within vehicle trim to create a sealed SABIC module with an integrated roll bar attachment bracket. The attachment bracket can include a hook assembly to position the module on the roll bar so the operator's hands are free to fasten the module to the roll bar. The integrated bracket allows attachment of the module to the bottom of the roll bar, thereby providing a compact design since no additional clearance zones are required because the fastener is contained inside the roll bar. Moreover, the modules do not require weld on brackets, thereby reducing weight and reducing packaging.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A sealed modular trim supplemental side air bag inflatable curtain (SABIC) module assembly for a vehicle, comprising:
   a SABIC; and
   a vehicle trim assembly encapsulating the SABIC, wherein the SABIC is sealed within the vehicle trim assembly and provided as a complete compact module configured for subsequent attachment to a vehicle roll bar,
   wherein the vehicle trim assembly includes:
      an upper trim having a first end, and a second end having a first aperture configured to align with a second aperture formed in the vehicle roll bar, the aligned first and second apertures configured to receive a first fastener for coupling the upper trim to the vehicle roll bar; and
      a lower trim having a first end coupled to the first end of the upper trim, and a second end having a third aperture configured to align with a fourth aperture formed in the vehicle roll bar, the aligned third and fourth apertures configured to receive a second fastener for coupling the lower trim to the vehicle roll bar.

2. The SABIC module assembly of claim 1, wherein the vehicle trim assembly provides a watertight enclosure to protect the SABIC from the environment when a roof of the vehicle is removed and the SABIC module assembly is in an open air vehicle interior.

3. The SABIC module assembly of claim 1, wherein the upper trim and the lower trim are separate and distinct trim components.

4. The SABIC module assembly of claim 1, wherein the vehicle trim assembly further includes a reinforcing middle trim having a first end and a second end, the middle trim second end coupled to the lower trim.

5. The SABIC module assembly of claim 4, wherein the first ends of the upper trim and lower trim are coupled to each other via welding, and wherein the middle trim second end is coupled to the lower trim via welding.

6. The SABIC module assembly of claim 1, further comprising an attachment bracket configured to couple the SABIC to the vehicle trim assembly.

7. The SABIC module assembly of claim 6, wherein the attachment bracket includes a first portion configured to attach to the SABIC, and a second portion having a fifth aperture configured to receive one of the first fastener and the second fastener.

8. The SABIC module assembly of claim 7, wherein the first portion includes a slot to receive a tether strap of the SABIC.

9. The SABIC module assembly of claim 7, wherein the fifth aperture is configured to align with the first and second apertures to receive the first fastener.

10. The SABIC module assembly of claim 9, wherein the fifth aperture receives a compression ring configured to mate to the vehicle roll bar.

11. The SABIC module assembly of claim 7, wherein the fifth aperture is configured to align with the third and fourth apertures to receive the second fastener.

12. A vehicle comprising the SABIC module assembly of claim 1 coupled to the vehicle roll bar.

13. A method of manufacturing a sealed modular trim supplemental side air bag inflatable curtain (SABIC) module assembly for a vehicle, comprising:
   providing a SABIC;
   providing a vehicle trim assembly;
   encapsulating the SABIC in the vehicle trim assembly, wherein the SABIC is sealed within the vehicle trim assembly; and
   providing the encapsulated SABIC as a complete compact module for subsequent attachment to a vehicle roll bar, wherein the vehicle trim assembly includes:
      an upper trim having a first end, and a second end having a first aperture configured to align with a second aperture formed in the vehicle roll bar, the aligned first and second apertures configured to receive a first fastener for coupling the upper trim to the vehicle roll bar; and
      a lower trim having a first end coupled to the first end of the upper trim, and a second end having a third aperture configured to align with a fourth aperture formed in the vehicle roll bar, the aligned third and fourth apertures configured to receive a second fastener for coupling the lower trim to the vehicle roll bar.

14. The method of claim 13, wherein the step of encapsulating the SABIC further includes encapsulating the SABIC in a watertight enclosure to protect the SABIC from the environment when a roof of the vehicle is removed and the SABIC module assembly is in an open air vehicle interior.

15. The method of claim 14, wherein the trim assembly further includes a reinforcing middle trim having a first end and a second end, the middle trim second end coupled to the lower trim; and
wherein the step of encapsulating the SABIC includes sealing the lower trim first end to the upper trim first end, and sealing the middle trim second end to the lower trim.

16. A sealed modular trim supplemental side air bag inflatable curtain (SABIC) module assembly for a vehicle, comprising:
a SABIC;
a vehicle trim assembly encapsulating the SABIC and including an upper trim and a lower trim, the lower trim having a first end, and a second end having a first aperture configured to align with a second aperture formed in the vehicle roll bar; and
an attachment bracket having a first portion configured to attach to the SABIC, and a second portion having a third aperture configured to align with the first and second apertures,
wherein the aligned first, second, and third apertures are configured to receive a fastener to couple the lower trim and the attachment bracket to the roll bar,
wherein the SABIC is sealed within the vehicle trim assembly and provided as a complete compact module configured for subsequent attachment to a vehicle roll bar.

17. The SABIC module assembly of claim 16, further comprising an inner reinforcement trim having a first end coupled to the upper trim and the lower trim first end, and a second end having a fourth aperture configured to align with the first, second, and third apertures to receive the fastener.

18. The SABIC module assembly of claim 16, wherein the upper trim includes a first end and a second end,
wherein the upper trim first end is coupled to the lower trim first end, and
wherein the upper trim second end is coupled to the lower trim second end proximate the first aperture.

19. The SABIC module assembly of claim 16, wherein the upper trim includes a first end and a second end,
wherein the upper trim first end includes a weather seal configured to seal against the vehicle roll bar, and
wherein the upper trim second end is coupled to the lower trim second end via a second fastener and defines a drainage path out of the encapsulating vehicle trim assembly.

20. The SABIC module assembly of claim 16, further comprising:
a second fastener coupling the upper trim to the lower trim;
a first weather seal that seals an upper interface between the upper trim and the lower trim; and
a second weather seal that seals a lower interface between the upper trim and the lower trim.

* * * * *